INVENTOR.
PAUL D. FRIDAY

April 20, 1971

P. D. FRIDAY 3,575,801

DUO DRUM MOLDING MACHINE

Filed July 15, 1968

INVENTOR.
PAUL D. FRIDAY
BY
Lee N. Schermerhorn
Attorney

April 20, 1971  P. D. FRIDAY  3,575,801
DUO DRUM MOLDING MACHINE
Filed July 15, 1968  8 Sheets-Sheet 8

INVENTOR.
PAUL D. FRIDAY
BY
Lee R. Schermerhorn
Attorney

United States Patent Office 3,575,801
Patented Apr. 20, 1971

3,575,801
DUO DRUM MOLDING MACHINE
Paul D. Friday, 4480 SW. Laurelwood Drive,
Portland, Oreg. 97225
Filed July 15, 1968, Ser. No. 744,964
Int. Cl. D21j 3/00
U.S. Cl. 162—389    13 Claims

ABSTRACT OF THE DISCLOSURE

The machine comprises a forming drum and a drying drum, both rotatable in unison in 90° step-by-step movement. Four sides of the forming drum are equipped with forming dies and four sides of the drying drum are equipped with heated drying dies. The forming dies are mounted for radial reciprocation. At a pick-up station the forming dies are projected downward into a furnish tank beneath the forming drum and then retracted. During three-quarters of a revolution the forming dies are under suction to remove water from the pre-forms. Then, at a transfer station, the forming dies are projected horizontally to transfer the pre-forms to drying dies on the drying drum, and then retracted. After three-quarters of a revolution on the drying drum, the dried articles are blown off the drying dies to a conveyor belt at a discharge station beneath the drying drum.

BACKGROUND OF THE INVENTION

This invention relates to a pulp molding machine.

Drum-type machines have the advantage of compactness and economy of floor space. In prior machines, however, this advantage has been offset by a number of disadvantages. In most prior rotary machines the molding or forming dies are rotated in the furnish tank. This produces undesirable variations in the product and tends to leave a flashing on the trailing edges. The products have unequal thickness at their leading and trailing edges because tilting dies make a thinner section on the upper edge of the pre-form as it leaves the furnish. There also tends to be an undesirable orientation of the fibers which weakens the products.

Further, there has been a serious problem in prior machines in attempting to mold deep drawn articles with steep side walls of small draft. The depth of the article has been limited. Also, the machines have not been capable of molding different sizes and types of articles simultaneously. The structures of the machines and the nature of the controls have made it necessary to complete a run on one type of articles before starting a second type. In a machine of large capacity it is often desired to produce different articles simultaneously.

SUMMARY OF THE INVENTION

In the present machine the forming dies are immersed in and withdrawn from the pulp furnish in vertical movement in horizontal position without tilting. This eliminates flashing and feather edges on the molded articles and assures even thickness of the articles. All the fibers are deposited in random directions; there is no predominant grain direction. The resulting uniformity of fiber deposition provides improved strength characteristics, permitting thinner wall sections and affording better shrinkage control; the shrinkage is uniform in all directions.

The wet pre-forms are subject to suction on the forming dies during three-quarters of a revolution of the forming drum to remove water. Then the pre-forms are transferred to drying dies on a drying drum by straight line radial movement of the forming dies. Straight line transfer movement allows the molding of deep drawn articles with steep side walls having minimum draft, which is often desired. The drying dies may be cold or heated as desired, heated dies being disclosed in the present machine. After three-quarters of a revolution on the drying drum, the dried articles are discharged from the under side of the drum.

An important advantage of the present machine is its flexibility of control making it possible to mold sixteen different articles simultaneously if desired. There are four pairs of die holders for forming dies on the forming drum, each pair having individual controls. This not only permits the simultaneously manufacture of articles of different size but also articles of different wall thickness from the same furnish.

Objects of the invention are to provide an improved pulp molding machine, to provide an improved rotary type machine; to provide a rotary machine in which the forming dies are not tilted in the furnish, to provide a machine of the type described which molds articles with random fiber direction, to provide a machine having better shrinkage control, to provide a machine capable of simultaneously molding articles of different size and thickness, to provide a rotary machine capable of molding deep drawn articles, to provide a novel and improved control system for the machine and to provide an entirely automatic machine which is rugged and reliable in operation and less subject to trouble than existing machines.

The invention will be better understood and additional objects and advantages will become apparent from the following description of the preferred embodiment illustrated in the accompanying drawings. Various changes may be made in the details of construction and arrangement of parts and certain features may be used without others. All such modifications within the scope of the appended claims are included in the invention.

DESCRIPTION OF THE PREFERRED EMBODIMENT

Figure 1:
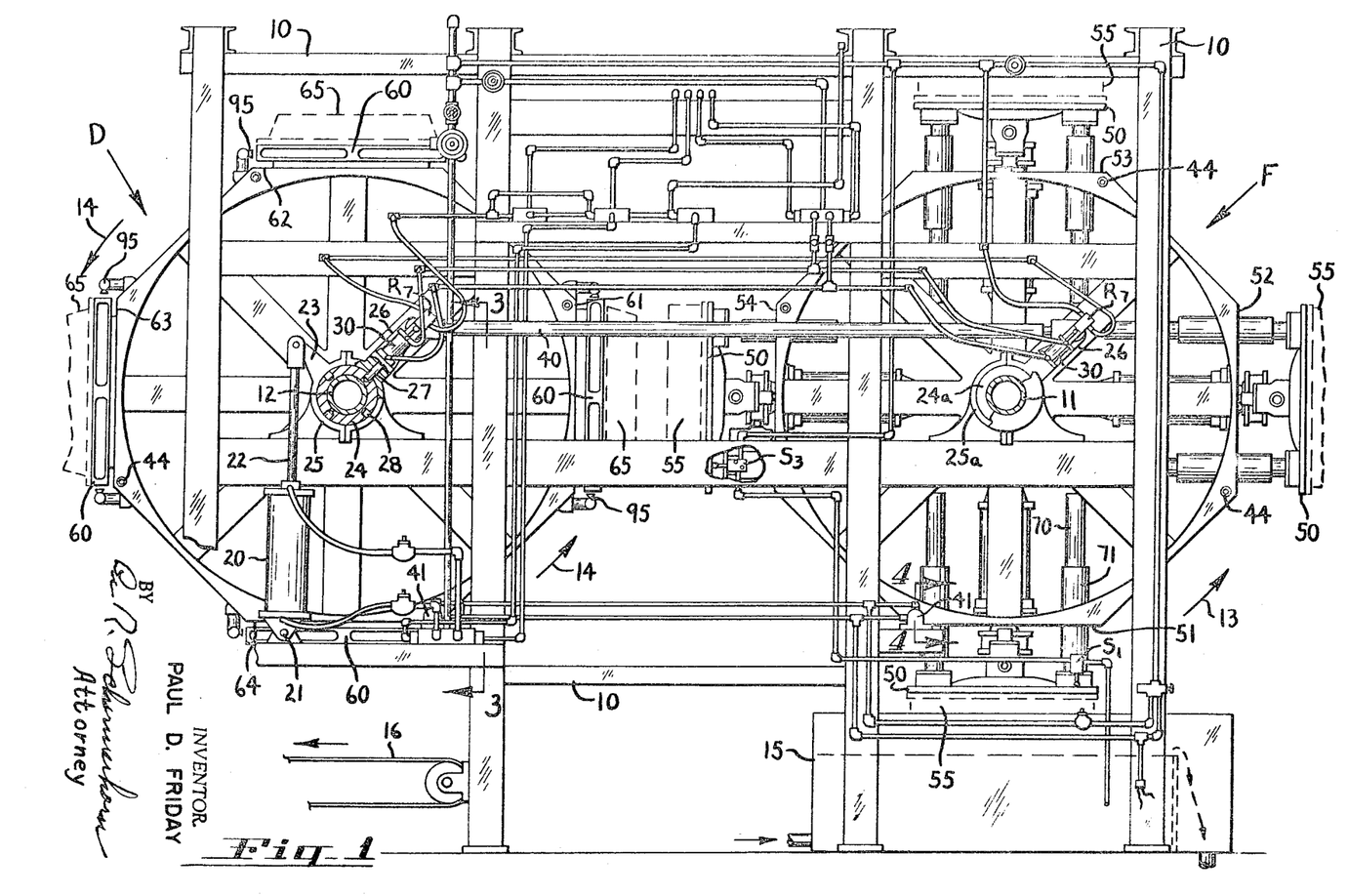
FIG. 1 is an elevation view, with parts broken away, showing the front side of a machine embodying the principles of the invention.
Figure 2:
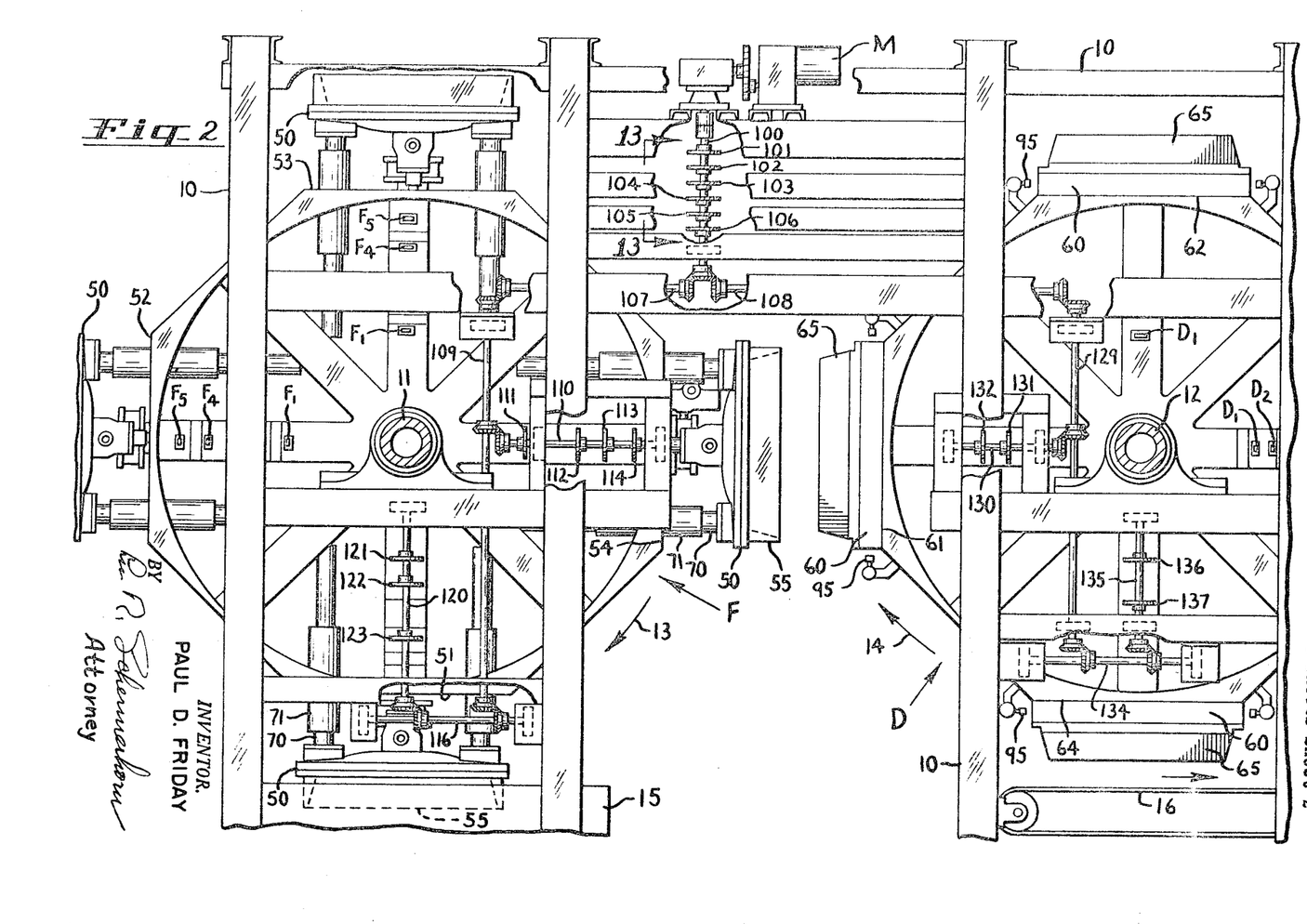
FIG. 2 is an elevation view of the back side of the machine, with parts broken away.

In FIGS. 1 and 2, the machine frame 10 has bearings supporting a hollow shaft 11 for forming drum F and bearings supporting a hollow shaft 12 for drying drum D. Forming drum F rotates in step-by-step movement in the direction of arrow 13 and drying drum D rotates in step-by-step movement in the direction of arrow 14. The two drums are connected together for simultaneous movement through 90° during their intervals of rotation and between these intervals of rotation the drums are indexed in four different dwell or rest positions. Beneath the forming drum F is a furnish tank 15 and beneath the drying drum D is a discharge conveyor 16.

Figures 3, 11, 13:
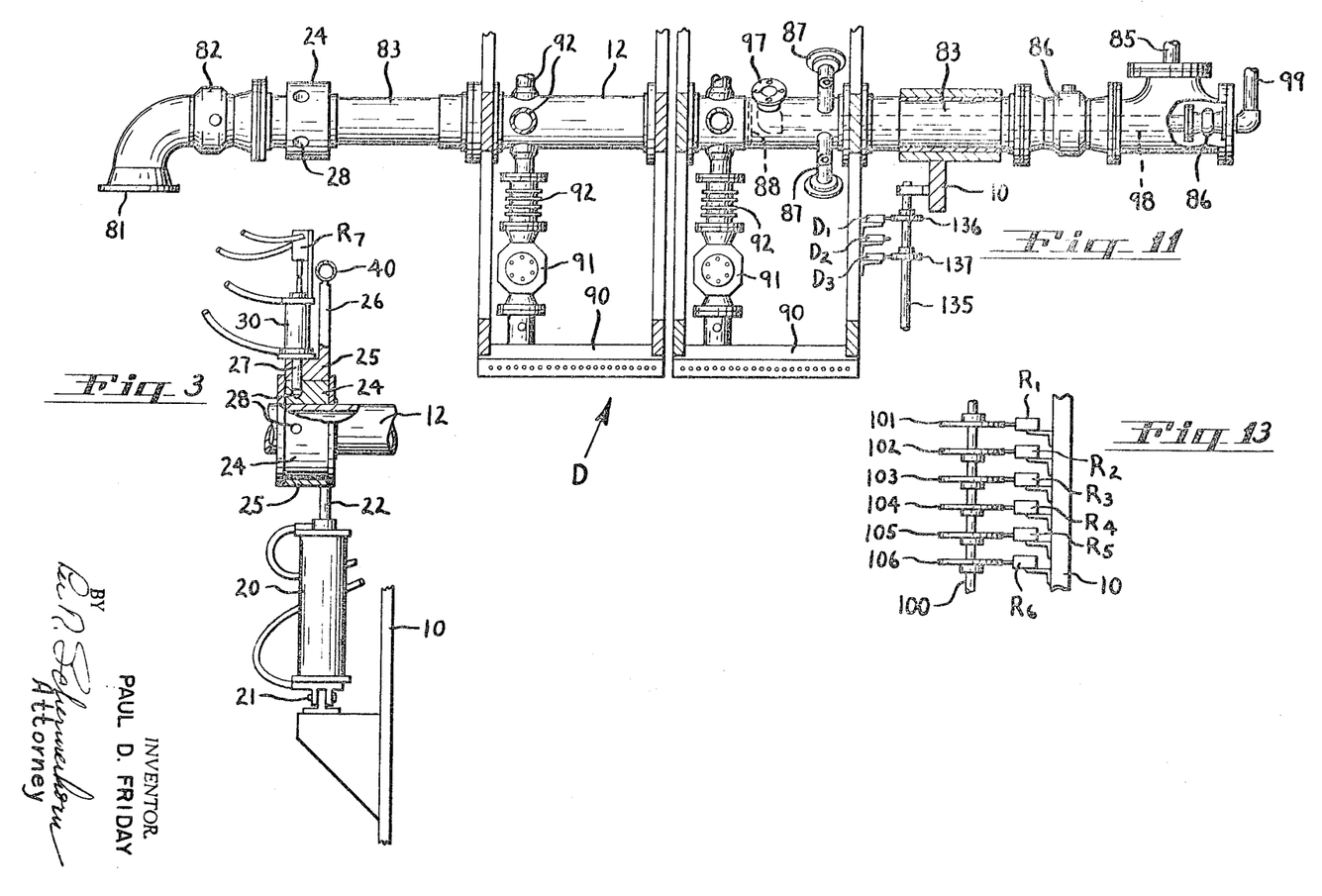
FIG. 3 is a fragmentary view with parts in section, taken on the line 3—3 in FIG. 1, showing elements of the drum rotating mechanism.
FIG. 11 is a vertical sectional view of the drying drum with parts broken away, as viewed from the right side of the machine in FIG. 1.
FIG. 13 is a view on the line 13—13 in FIG. 2, showing the pilot valves in FIG. 14.

The drums F and D are rotated by the double acting pneumatic cylinder 20 in FIGS. 1 and 3, the lower end of which is pivotally mounted at 21 on frame 10. Piston rod 22 is pivotally connected with an arm 23 on a sleeve 25 which is rotatably mounted on a collar 24 fixed on shaft 12. Sleeve 25 has a second arm 26 carrying a radially slidable rotating pin 27 which is arranged to engage one after another of four holes 28 in collar 24. The rotating pin may be shifted into and out of engagement with holes 28 by a double acting pneumatic cylinder 30 on the arm 26.

FIG. 1 shows the parts in rest or dwell position with rotating pin 27 engaged in a hole 28 of collar 24. To produce rotation of the drum D, air pressure is supplied to the upper end of cylinder 20. A downward stroke of piston rod 22 rotates shaft 12 and drum D 90° counterclockwise. Then rotating pin 27 is retracted by cylinder 30 and air pressure is supplied to the lower end of cylinder 20 to return sleeve 25 and its arm 26 to the starting position shown while shaft 12 and drum D remain stationary. Thus, sleeve 25 rotates with shaft 12 in counterclockwise movement in FIG. 1 but rotates freely on the shaft in clockwise movement.

Sleeve 25a on shaft 11 is identical to the sleeve 25 except that it lacks the arm 23. Sleeve 25a is equipped with an arm 26 having a rotating pin 27 actuated by a cylinder 30 to engage holes in a collar 24a on shaft 11 as described on shaft 12. Sleeve 25a is rotated in unison with sleeve 25 by a tie rod 40 which is pivotally connected with both arms 26. Cylinder 30 on sleeve 25a is actuated in unison with cylinder 30 on sleeve 25. Forming drum F thereby rotates in unison with drying drum D.

Figures 4, 7, 8:
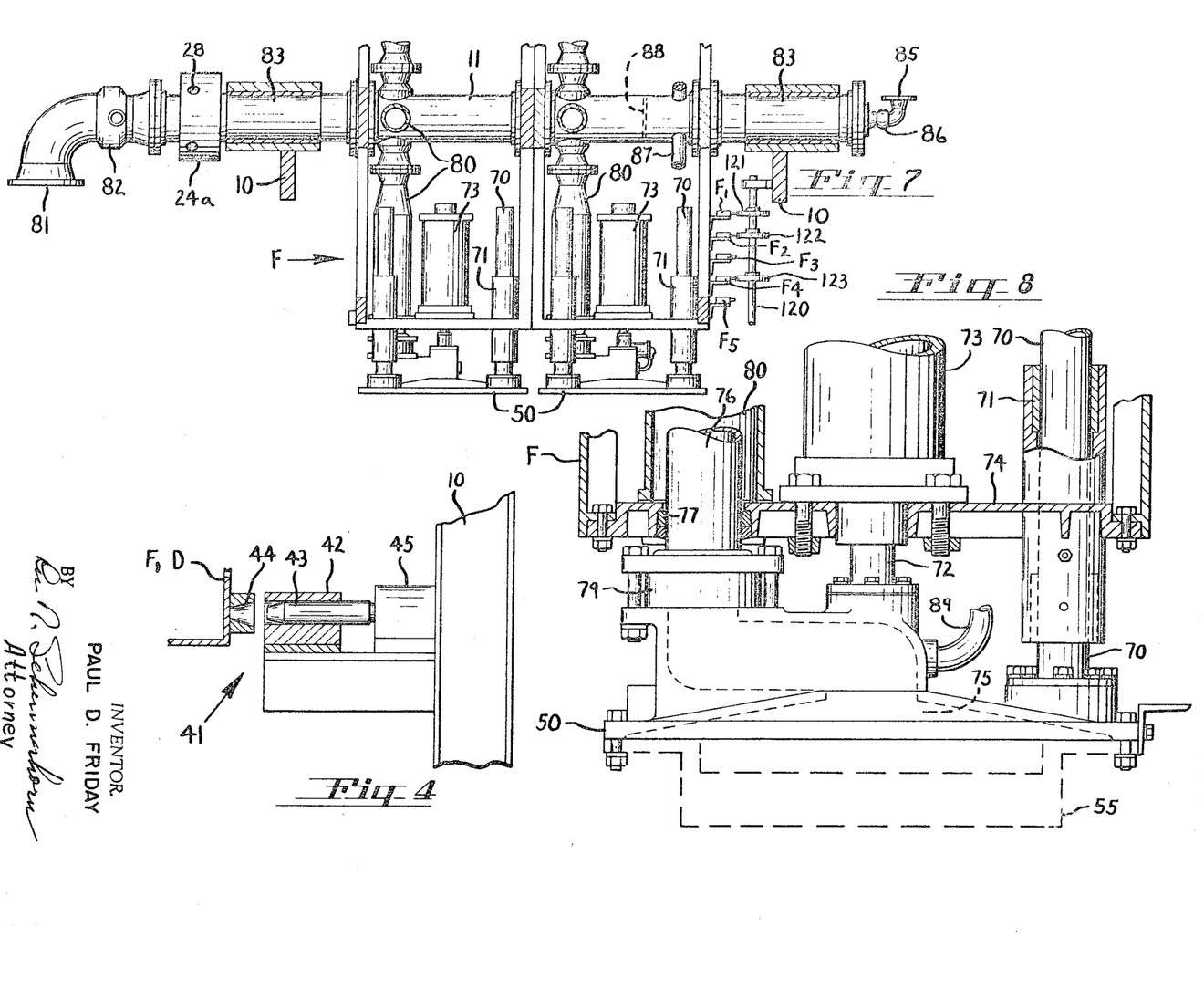
FIG. 4 is a view on the line 4—4 in FIG. 1, showing the drum indexing mechanism.
FIG. 7 is a vertical sectional view of the forming drum with parts broken away, as viewed from the right side of the machine in FIG. 1.
FIG. 8 is an enlarged view with parts in section, showing a portion of FIG. 7.

The drums F and D are indexed in four dwell positions by the two index devices 41 in FIG. 1. The details of this device are shown in FIG. 4. Mounted on frame 10 is a horizontal guide 42 for a slidable index pin 43 having a conical nose to engage a conical socket 44 on the drum. Pin 43 is reciprocated by a double acting pneumatic cylinder 45. After each downward stroke of piston rod 22, cylinder 45 is energized to project pin 43 into socket 44. The conical shape of the nose of the pin and the socket allows the pin to nudge the drum to indexed position so that any small error in the length of stroke of piston rod 22 will not be cumulative from cycle to cycle. The two index pins 43 then hold the two drums stationary while the piston rod 22 returns the sleeves 25 and 25a to starting position and throughout the dwell period of the drums. The two cylinders 45 are actuated in unison to retract their pins 43 before cylinder 20 is again energized to produce another downward stroke of piston rod 22.

As seen in FIGS. 1 and 2, forming drum F has a pair of reciprocating die holders 50 at each of four die holder positions 51, 52, 53, 54 which are 90° apart around the drum. Each die holder carries a forming die 55. Drying drum D has a pair of die holders 60 at each of four positions 61, 62, 63, 64 which are 90° apart around the drum. Each die holder carries a drying die 65. Die holders 60 do not reciprocate.

Position 51 is at the forming station. During the dwell interval of the drums, the pair of die holders 50 at this station project their dies downward in vertical movement into the furnish tank 15. Suction is applied to the immersed dies, causing them to draw furnish into the porous dies and deposit a pulp pre-form therein.

Before the end of the dwell period of the drums, the immersed dies 55 are retracted upward in vertical movement and then the drums rotate 90° counterclockwise in FIG. 1 to place the new pre-form in position 52. It remains in this position while another pair of dies 55 is immersed in the furnish in tank 15 for deposition of pulp pre-forms. With each downward stroke of piston rod 22, forming drum F rotates the pre-forms 90° with suction applied continuously to remove water.

At position 54 after three increments of movement and 270° of rotation, the die holders 50 are again projected radially to press the pre-forms against porous suction dies 65 in die holders 60 at position 61 on drying drum D. The forming dies press the still damp pre-forms against the drying dies to shape the exterior surfaces of the pre-forms and compress the pulp as may be desired to produce the intended final thickness of the article. During this dwell interval, suction is removed from the die holders 50 and air pressure is applied momentarily to transfer the pre-forms from the forming dies 55 to the drying dies 65.

Then the die holders 50 are retracted and the drums F and D rotate another increment at 90° counterclockwise in FIG. 1. Drying of the pre-forms continues as they rotate step-by-step from position 61 to position 64, the die holders 60 being subject to continuous suction. Die holders 60 are equipped with heating means but cold drying may be employed if desired, as previously explained. At position 64 suction is shut off from die holders 60 and air pressure is applied momentarily to blow the dried articles onto discharge conveyor 16.

Referring now to FIGS. 7 and 8, each forming die holder 50 is fixedly mounted at its corners on four rods 70 which reciprocate in tubular guides 71 on drum F. For reciprocation, the center of each die holder is connected with a piston rod 72 in a double acting cylinder 73. Guides 71 and cylinder 73 are mounted on a plate 74 on the drum F, there being two such assemblies at each position 51, 52, 53 and 54 as shown in FIG. 7. All the cylinders 73 are radial to shaft 11 and guides 71 are parallel with the cylinders in each die holder position around the drum.

Each die holder 50 has a suction cavity 75 which communicates through suction valve 79 with a suction tube 76 on the die holder. Tube 76 slides in a sealing ring 77 in plate 74 when the die holder reciprocates. The inner end of tube 76 is in suction communication with a radial suction tube 80 which is connected at its inner end with hollow shaft 11. The outer end of tube 80 is closed at plate 74. A stationary suction connection 81 is connected with the front end of shaft 11 by a rotating seal device 82. Shaft 11 has journal portions 83 to support the drum F for rotation in suitable bearings in the machine frame 10.

On the back end of shaft 11 there is a stationary air pressure connection 85 having a rotary seal device 86 for supplying air pressure to pipes 87. The suction and pressure portions of shaft 11 are separated by a partition 88. Pipes 87 supply air pressure to hose 89 in FIG. 8 to blow off the pre-form at position 54.

Figure 9:
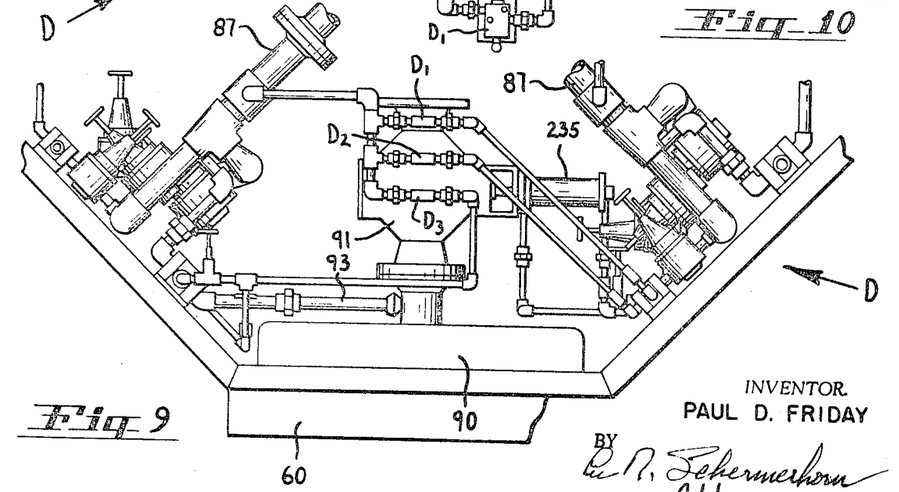
FIG. 9 is a fragmentary elevation view with parts removed, showing a portion of the drying drum, viewed from the back side of the machine.

Referring now to FIGS. 9 and 11, each die holder position on drying drum D is equipped with a suction chamber 90 connected with the outer side of a suction control valve 91. The inner side of valve 91 is connected with hollow shaft 12 by a radial suction tube 92. A stationary suction connection 81 is connected to the front end of shaft 12 by a rotating seal device 82. These fittings apply suction to the porous suction dies 65 for removing moisture while the pre-forms are drying on the drying drum.

Figure 10:
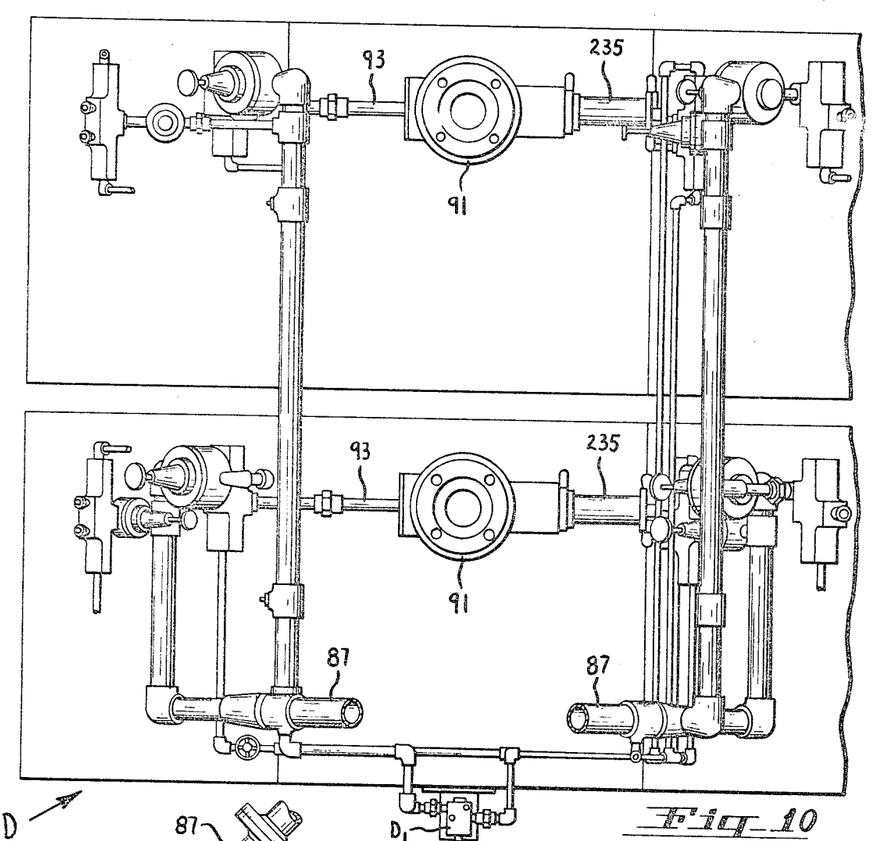
FIG. 10 is a top plan view of the structure shown in FIG. 9.

Shaft 12 has journal portions 83 to support the drum D for rotation in suitable bearings in the machine frame 10. On the back end of shaft 12 there is a stationary air pressure connection 85 having a rotary seal device 86 for supplying air pressure to pipes 87. The suction and pressure portions of shaft 12 are separated by a partition 88. Air pressure from pipes 87 is conveyed by pipes 93 in FIGS. 9 and 10 to suction chambers 90 to blow off the dried product to conveyor belt 16.

Figure 12:
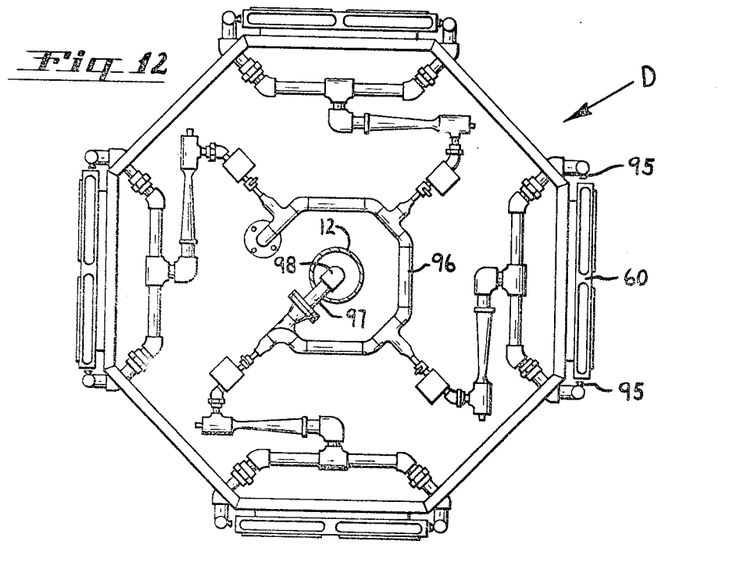
FIG. 12 is an end view of the drying drum with parts removed, showing the gas conduits for the burners which heat the die holders.

As seen in FIG. 12, the drying die holders 60 have combustion chamber cavities into which flame is directed from gas burners 95. Gas is supplied to these burners through a supply and regulating manifold system 96 connected with a radial branch 97 of axial supply pipe 98 within shaft 12. The back end of shaft 12 is equipped with an external gas connection 99 and rotary seal 86 as shown in FIG. 11. The heated die holders 60 heat the dies 65 for rapid drying of the pre-forms.

Control system

Timing of all the functions of the machine is controlled by the timing motor M in FIG. 2. The motor M may be a variable speed motor or a constant speed motor with a variable drive for the purpose of driving a vertical master cam shaft 100 at an adjustable constant speed. Cam shaft 100 carries a series of timing cams 101 to 106. The lower end of shaft 100 drives a pair of upper horizontal shafts 107 and 108 through bevel gears.

Shaft 107 drives a vertical shaft 109 at the back end of forming drum F. Shaft 109 drives a horizontal cam shaft 110 at drum position 54. This shaft is equipped with cams 111, 112, 113 and 114. Shaft 109 also drives a lower horizontal shaft 116 which in turn drives a vertical cam shaft 120 at drum position 51. Cam shaft 120 is equipped with cams 121, 122 and 123.

In a similar manner, upper horizontal shaft 108 drives a vertical shaft 129 at the back end of drying drum D. Shaft 129 drives a horizontal cam shaft 130 at drum position 61. This shaft is equipped with cams 131 and 132. Shaft 129 also drives a lower horzintal shaft 134 which in turn drives a vertical cam shaft 135 at drum position 64. Cam shaft 135 is equipped with cams 136 and 137.

Figure 14:
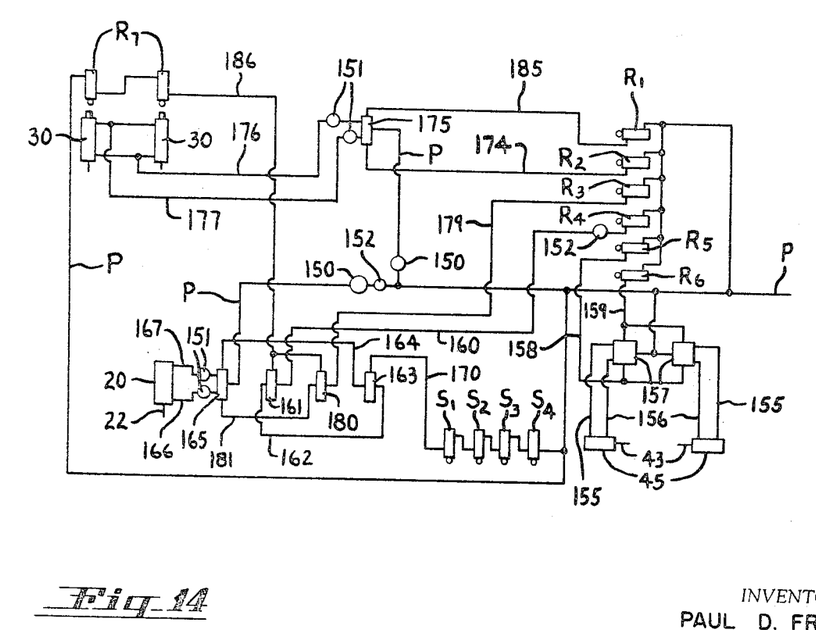
FIG. 14 is a schematic diagram of the pneumatic drum rotation and indexing control system on the frame of the machine.

Mounted on frame 10 for actuation by the cams 101 to 106 on vertical master cam shaft 100 are six pneumatic pilot valves $R_1$, $R_2$, $R_3$, $R_4$, $R_5$ and $R_6$, as shown in FIGS. 13 and 14. These valves are designated as drum rotation control valves since they control the drum rotating and indexing mechanisms.

Actuation of valve $R_1$ by cam 101 engages the rotating pins 27 in holes 28 in collars 24 and 24a on the shafts of both drums F and D as shown in FIGS. 1 and 3. Actuation of valve $R_2$ by cam 102 disengages these rotating pins.

Actuation of valve $R_3$ by cam 103 supplies air pressure to the lower end of cylinder 20 in FIG. 1 to rotate sleeves 25 and 25a to their starting position shown in FIG. 1 after pins 27 have been disengaged from holes 28. Actuation of valve $R_4$ by cam 104 admits air pressure to the upper end of cylinder 20 after pins 27 have been engaged in holes 28, to rotate both drums D and F counterclockwise 90° in FIG. 1.

Actuation of valve $R_5$ by cam 105 engages index pins 43 with both drums as shown in FIG. 4. Actuation of valve $R_6$ by cam 106 disengages both index pins.

Pilot valves $S_1$ to $S_4$ in FIG. 14 are safety devices to prevent drum rotation while any die holder on the forming drum F is in extended position. These valves are mounted on frame 10 on front and back sides of the machine adjacent opposite ends of forming drum F.

Valves $S_1$ and $S_2$ are at drum position 51 to prevent drum rotation until the forming dies have been withdrawn from furnish tank 15. Valves $S_3$ and $S_4$ are located at drum position 54 to prevent drum rotation until the forming dies have been fully retracted after transfer of the pre-forms to drying drum D. Valves $S_1$ and $S_3$ appear in FIG. 1. There are two die holders 50 side by side at each designated drum position and valves $S_2$ and $S_4$ are similarly located on the back side of the machine for actuation by the companion die holders.

Figure 5:
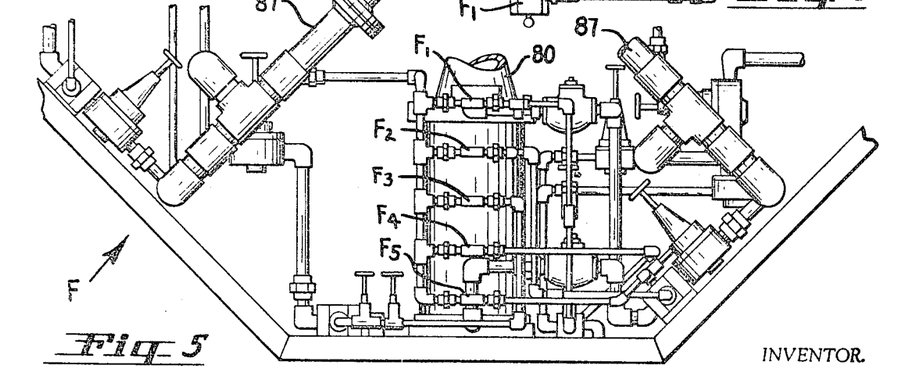
FIG. 5 is a fragmentary elevation view with parts removed, showing a portion of the forming drum, viewed from the back side of the machine.
Figure 6:
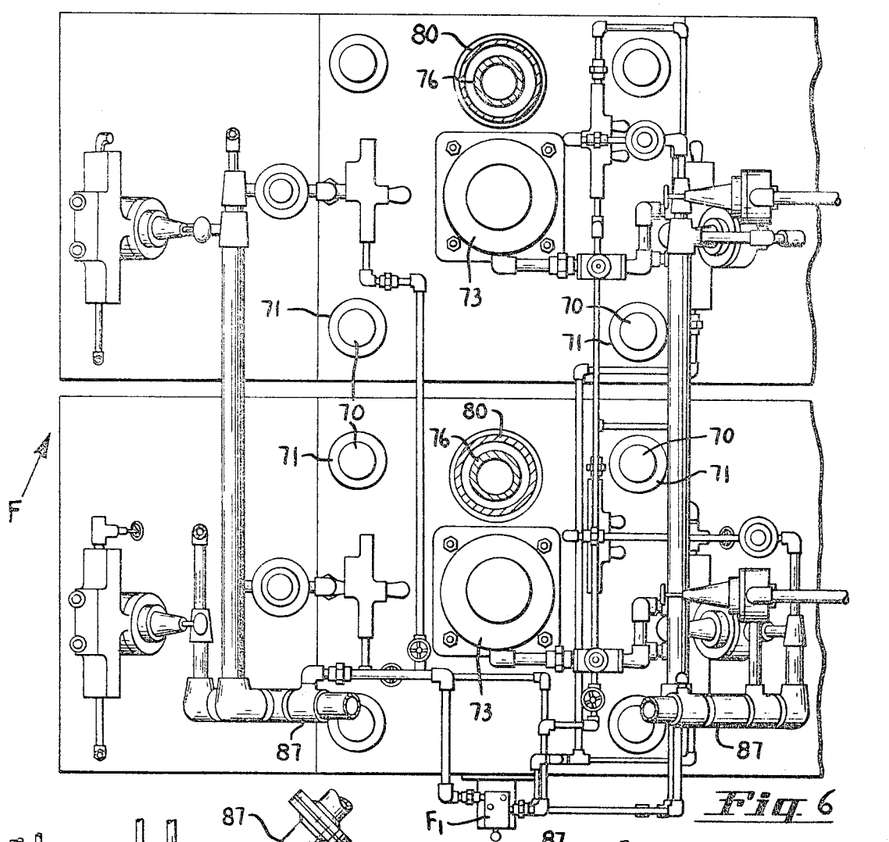
FIG. 6 is a top plan view of the structure shown in FIG. 5.
Figure 15:
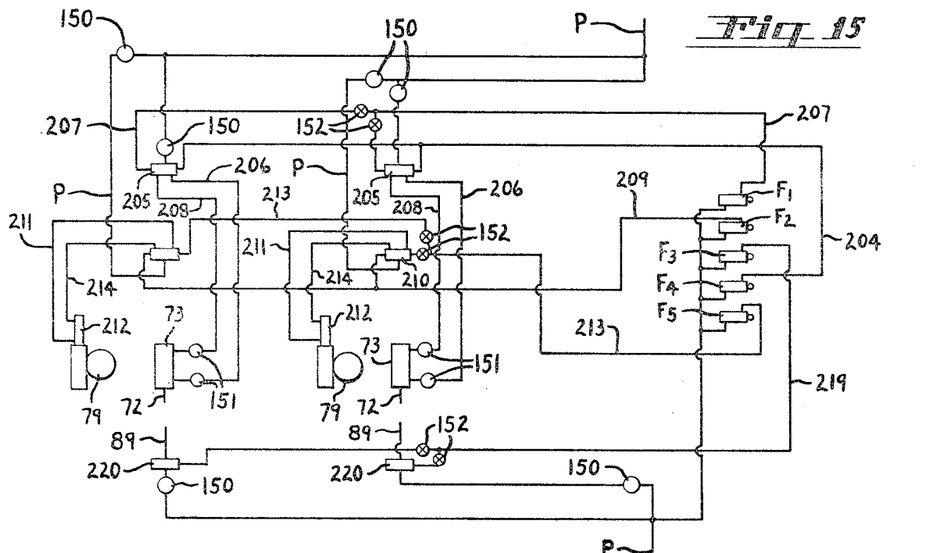
FIG. 15 is a schematic diagram of the pneumatic control system for the die holders on the forming drum.

Referring now to FIGS. 5, 7 and 15, the back end of forming drum F carries five pilot valves $F_1$ to $F_5$ at each die holder position for actuation by the cams 121 to 123 on vertical cam shaft 120 and cams 111 to 114 on horizontal cam shaft 110 in FIG. 2. Valve $F_1$ operates to retract the forming die when actuated by cam 121 in drum position 51 or cam 111 in drum position 54. Valve $F_2$ opens a suction valve to apply suction to the forming dies when actuated by cam 122.

Valve $F_3$ admits compressed air momentarily to the suction dies to blow off the pre-form when actuated by cam 112 in transfer position 54. Valve $F_4$ operates to extend the suction die holders when actuated by cams 123 and 113 in drum positions 51 and 54. Valve $F_5$ closes the suction valve preparatory to blow off when actuated by cam 114.

Figure 16:
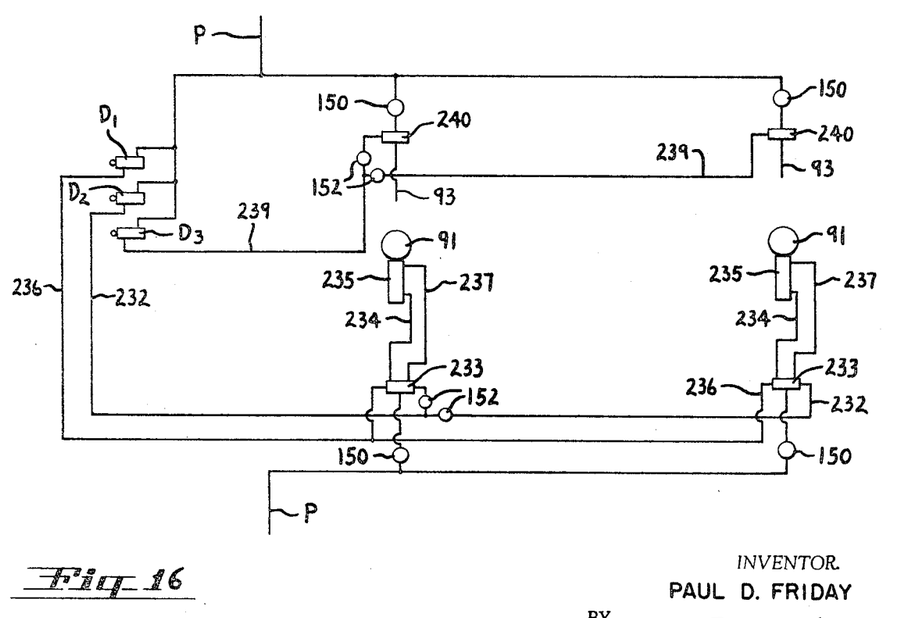
FIG. 16 is a schematic diagram of the pneumatic control system for connecting the die holders on the drying drum to suction or air pressure.

Referring now to FIGS. 9, 11 and 16, the back end of drying drum D carries three pilot valves $D_1$, $D_2$, and $D_3$ at each drying die position. These pilot valves are arranged for actuation by cams 136 and 137 on vertical cam shaft 135 and cams 131 and 132 on horizontal cam shaft 130 in FIG. 2. Valve $D_1$ closes a suction valve to the drying dies preparatory to blow off in position 64 when actuated by cam 136.

Valve $D_2$ opens the suction valve to receive the pre-form when actuated by cam 131. Valve $D_3$ introduces compressed air to the drying dies, after closing of the suction valve, to blow the dried article off to discharge conveyor 16 when the valve is actuated by cam 137. Also, valve $D_3$ is actuated momentarily at drum position 61 by cam 132 to cause a blast of air heated by passage through hot die holders 60 to discharge through the pre-form on die holder 50 at drum position 54 at the moment of transfer. This hot air is drawn through the pre-form by suction in die holder 50 to speed up the drying process.

FIG. 14 is a schematic diagram of the drum rotation control system. The operating devices controlled by this system are drum rotation cylinder 20 in FIG. 1, the two drum rotating pin actuating cylinders 30 in FIG. 1 and the two drum indexing pin actuating cylinders 45 in FIG. 4. These are all double acting air cylinders actuated by pressure supply line P in FIG. 14.

At this point it will be explained that this and the other control system diagrams contain numerous pressure regulating valves 150, speed control valves 151 and manual valves 152. Since these valves perform their customary and obvious functions and do not affect the timing of the operations to be described, they will not be mentioned further. In the normal operation of the machine, these valves permit the flow of air whenever there is a demand for air and may be disregarded in tracing the air line circuits since they do not stop the flow of air at any time in the normal operation of the machine. The purpose of the manual valves is to shut off air pressure from certain portions of the system in servicing the machine or to make certain portions of the machine inoperative.

During each dwell interval of the drums F and D, piston rod 22 remains in extended position as shown in FIG. 1. The drums are then locked against rotation by index pins 43 in FIG. 4, the double acting cylinders 45 holding the pins in extended positions. Air lines 155 to the head ends of cylinders 45 are under pressure and lines 156 connected to the rod ends of the cylinders are open to exhaust. These lines are controlled by relay valves 157 which are connected to the pressure supply line P.

Actuation of pilot valve $R_5$ by cam 105 admits air pressure to line 158 to shift relay valves 157 to positions for energizing lines 155 to extend the index pins. Actuation of pilot valve $R_6$ by cam 106 admits air pressure to line 159 to shift relay valves 157 to positions for energizing lines 156 to retract the index pins. All of pilot valves $R_1$ to $R_6$ are spring held in normally closed position and are actuated to open position by the cams.

When is it time for the drums to rotate, cam 104 opens pilot valve $R_4$ admitting air pressure through line 160, normally open relay valve 161 and line 162 to valve 163. Valve 163 transmits pressure from line 162 to line 164 to shift relay valve 165 to position to admit pressure from supply line P through line 166 to the rod end of cylinder 20 to rotate the drums. The head end of cylinder 20 exhausts through line 167 and valve 165.

The drums will not be rotated if any of the forming drum die holders 50 fail to retract. This is the safety function of pilot valves $S_1$ to $S_4$. These are spring actuated normally closed valves connected in series between pressure supply line P and a line 170 which controls relay valve 163. Valve 163 is held normally closed by a spring and is opened by air pressure in line 170.

Valve 163 will close if any one of the safety valves $S_1$ to $S_4$ are closed. When die holders 50 are properly retracted in drum positions 51 and 54, the die holders open valves $S_1$ to $S_4$ causing relay valve 163 to open. Cylinder 20 will not be actuated to rotate the drums if any one of the four die holders 50 in positions 51 and 54 have not retracted properly.

At the end of the drum rotating stroke of piston rod 22, cam 102 opens pilot valve $R_2$ to disengage rotating pins 27 from the collars 24 and 24a on the two drum shafts. Valve $R_2$ admits pressure through line 174 to the lower end of relay valve 175. This valve movement admits pressure from pressure supply pipe P to a line 176 connected with the rod ends of the two cylinders 30 to retract the pins 27 on both drums. Line 177 exhausts the head ends of cylinders 30 through valve 175.

Cam 103 then opens pilot valve $R_3$ to return the sleeves 25 and 25a and their arms 26 to the starting position shown in FIG. 1. Valve $R_3$ admits pressure through line 179 and relay valve 180 to line 181 connected with the lower end of relay valve 165. Pressure in line 181 shifts valve 165 to connect pressure supply line P through line 167 to the head end of cylinder 20 to extend piston rod 22 and rotate sleeves 25 and 25a clockwise as described.

Cam 101 opens pilot valve $R_1$ to admit pressure through a line 185 to the upper end of relay valve 175. This actuation of valve 175 admits pressure from line P through line 177 to the head ends of cylinders 30 to re-engage pins 27 with holes 28 in the collars 24 and 24a. This returns the parts to their starting position shown in FIG. 1. The actuation of pilot valves $R_5$ and $R_6$ controlling indexing pins 43 is coordinated with the actuation of valves $R_1$ and $R_2$ controlling the drum rotating pins 27.

Pilot valves $R_7$ prevent operation of cylinder 20 to rotate the drums until both pins 27 have been engaged with the collars 24 and 24a. Pilot valves $R_7$ are mounted on cylinders 30 as shown in FIGS. 1 and 8 for actuation by the upper ends of piston rods in cylinders 30. Valves $R_7$ are normally closed valves connected in series between pressure supply line P and a line 186 connected with normally open relay valve 161 and normally closed relay valve 180.

When drum rotating pins 27 are retracted, they open valves $R_7$ causing valve 161 to close and valve 180 to open. The closing of valve 161 prevents a downward stroke of piston rod 22 and the opening of valve 180 permits an upward stroke. Conversely, when pins 27 are extended, a downward stroke of piston rod 22 is permitted and an upward stroke is prevented, so that the drums cannot be rotated in reverse direction.

FIG. 15 is a schematic diagram of the pneumatic control system at each of the four die holder positions on forming drum F. There are four such die holder positions on the forming drum, each having its own system as shown in FIG. 15. It will be remembered that there are two die holders in each position whereby there are two cylinders 73 and piston rods 72 for extending and retracting the die holders, two butterfly suction valves 79 for controlling suction to the two die holders and two air pressure lines 201 connected to the two die holders for blowing off the partially dried pre-forms at transfer position 54. The pilot valves $F_1$ to $F_5$ control cylinders 73, suction valves 79 and air pressure lines 201.

Pilot valves $F_1$ to $F_5$ are normally spring closed and are all connected with a pressure supply line P which is connected to a pressure supply pipe 87 in FIG. 7. These valves are opened and closed at intervals by cams 111 to 114 on horizontal cam shaft 110 and cams 121 to 123 on vertical cam shaft 120 in FIG. 2.

The opening of pilot valve $F_4$ admits pressure to a line 204 connected with one end of each die holder relay valve 205 admitting pressure from supply line P through the relays to lines 206 connected with one end of each cylinder 73 to extend the die holders. The opening of pilot valve $F_1$ admits pressure through a line 207 to the opposite ends of relay valves 205 shifting these valves to a position admitting supply line pressure through lines 208 to the opposite ends of cylinders 73 to retract the die holders.

The opening of pilot valve $F_2$ admits pressure to a line 209 connected with one end of each relay valve 210 for admitting pressure through the relay valve from supply line P to lines 211 connected with one end of each actuating cylinder 212 for the suction valves 79 in FIG. 8. This opens the suction valves to apply suction to the die holders. The opening of pilot valve $F_5$ admits pressure to a line 213 connected with the opposite ends of relay valves 210. This shifts the relay valves to a position admitting pressure from supply line P through the lines 214 to the opposite ends of cylinders 212 to close the suction valves 79.

Pilot valve $F_3$ is opened momentarily to admit pressure to line 219 and then promptly re-closed. Line 219 is connected with relay valves 220. These are spring-actuated, normally closed valves which when opened connect the blow off lines 89 in FIG. 8 with pressure supply line P.

FIG. 16 is a schematic diagram of the pneumatic control system at each one of the four die holder positions on drying drum D. Again, it will be remembered that there are two die holders in each of the four positions on the drum. This control system includes the pilot valves $D_1$ to $D_3$, suction valves 91 in FIG. 9 for applying suction to the die holders, and pressure lines 93 in FIG. 9 for applying air pressure to the die holders to blow off the dried products onto conveyor belt 16. Pilot valves $D_1$, $D_2$ and $D_3$ are actuated by cams 131 and 132 on horizontal cam shaft 130 and cams 136 and 137 on vertical cam shaft 135 in FIG. 2. These valves are all connected with a pressure supply line P and are normally spring closed, being actuated to open positions by the cams. Supply lines P are connected with a pressure pipe 87 in FIG. 11.

The opening of pilot valve $D_2$ admits pressure to a line 232 connected to one end of each suction relay valve 233 shifting the relay valves to positions admitting pressure through the valves from pressure supply line P to lines 234 connected with one end of each suction valve actuating cylinder 235 to open the suction valves 91. The opening of pilot valve $D_1$ admits pressure through line 236 to the opposite ends of relay valves 233. This shifts the relay valves to positions admitting pressure through lines 237 to the opposite ends of actuating cylinders 235 for closing the suction valves.

The opening of pilot valve $D_3$ admits pressure through line 239 to the blow off relay valves 240. These valves are normally spring closed, the admission of pressure through line 239 opening the valves to transmit pressure from supply line P to the blow off pipes 93.

Operation

The operation of the timing cams will be described with reference to the formation and progress of a pair of pre-forms through the machine. FIG. 1 illustrated the starting position wherein a pair of die holders 50 and dies 55 at drum position 51 on forming drum F are ready for immersion of the dies into furnish tank 15 during a dwell interval of the drums. The various timing cams driven by motor M rotate continuously to control the duration of the dwell intervals and initiate all the functions of the machine in timed sequence. The machine goes through a complete operating cycle with each 90° drum rotation and seven machine cycles are necessary to form, dry, and discharge a product.

The first timing event is the actuation of pilot valve $F_4$ by cam 123 to extend the pair of dies 55 and die holders 50 at position 51 downward. After a sufficient delay to allow the dies to move down and become immersed in the furnish in tank 15, pilot valve $F_2$ is actuated by cam 122 to open the pair of suction valves 79 at position 51. Liquid furnish is sucked through the system, leaving pulp solids on the forming screens in the dies to build up pulp pre-forms. Afteer an interval, pilot valve $F_1$ is actuated by cam 121 to retract the immersed die holders out of the furnish tank, the suction valves 79 remaining open to draw water out of the pre-forms.

In each instance, the cam actuation of a pilot valve is of brief duration, allowing the valve to return to its normal position. When continuation of a pilot valve-initiated function is desired, that is accomplished by the various relay valves as previously described.

Pilot valve $R_1$ is then actuated by cam 101 to engage rotating pins 27 with the collars 24 and 24a and immediately thereafter pilot valve $R_6$ is actuated by cam 106 to disengage the index pins 43 from both drums. Immediately following this event, pilot valve $R_4$ is actuated by cam 104 causing piston rod 22 to make a downward stroke and rotate both drums 90° counterclockwise in FIG. 1.

After a sufficient interval to allow time for drum rotation, pilot valve $R_5$ is actuated by cam 105 to again engage the index pins 43. Immediately following this event, pilot valve $R_2$ is actuated by cam 102 to disengage both rotating pins 27 from collars 24 and 24a. Then pilot valve $R_3$ is actuated by cam 103 to produce an upward stroke of piston rod 22 returning the collars 24 and 24a and tie rod 40 to the starting position in FIG. 1 without rotating the drums. This return stroke occurs during a portion of a dwell interval while another pair of die holders 50 and dies 55 are being extended downward into furnish tank 15 for the formation of another pair of pre-forms at position 51. During this dwell interval, the pre-forms under consideration are at drum position 52 and are subject to continuous suction for water removal.

After another 90° rotation by the operation of cams 101 to 106 on pilot valves $R_1$ to $R_6$, the pre-forms under consideration arrive at drum position 53 where they remain during another dwell interval, still under suction. The next drum rotation carries the pre-forms under consideration to drum position 54 and the beginning of another dwell interval. In each dwell interval, another pair of dies is immersed in the furnish tank at drum position 51 for the formation of new pre-forms as described.

When the pre-forms under consideration arrive at drum position 54 on the forming drum, pilot valve $F_4$ is actuated by cam 113 to extend forming drum dies 55 at position 54 toward the drying drum die 65 at position 61 and place the pre-forms in the drying dies. Then pilot valve $D_3$ in drying drum position 61 is actuated by cam 132 to open valves 240 and discharge a momentary blast of air from the pair of dies 65 on the drying drum. This air is heated by passage through the heated die holders 60 and is drawn through the pre-forms by the continuation of suction in die holders 50. Moisture on the outer surfaces of the pre-forms is rapidly evaporated and carried away by the suction system in the forming drum F.

Then pilot valve $F_5$ is actuated by cam 114 to close suction valves 79 at drum position 54 in the forming drum and pilot valve $D_2$ is actuated by cam 131 to open suction valves 91 at drum position 61 in the drying drum D. Immediately following the hot air blast, pilot valve $F_3$ is actuated by cam 112 to open air pressure valves 220 and blow off the pre-forms from the pair of forming dies 55. The combined action of air pressure on one side and suction on the other side transfers the pre-forms from forming dies 55 to drying dies 65. The application of compressed air is only momentary and is immediately shut off. At the same moment, pilot valve $F_1$ is actuated by cam 111 to retract the pair of forming die holders 50 in drum position 54, following which the drums again rotate 90° to the next dwell position.

In transferring the pre-forms from forming dies 55 to drying dies 65, the piston rods 72 may be caused to press the pre-forms firmly against the drying dies so as to form and smooth the rough surfaces of the pre-forms which were outermost on forming drum F.

After two more 90° increments of drum rotation, the pair of pre-forms under consideration arrives at drum position 64 on drying drum D. During their travel of 270°, including dwell intervals at positions 62 and 63, the pre-forms are subject to continuous suction and are preferably heated by the gas burners 95 in FIG. 12. This either completes the drying of the pre-forms or dries them sufficiently so that they may be removed from their drying dies 65.

Then pilot valve $D_1$ is actuated by cam 136 to close suction valves 91 and pilot valve $D_3$ is actuated by cam 137 to open compressed air valves 240 and admit compressed air to the pair of die holders 60 in drum position 64. This blows the pre-forms, or completed products as the case may be, off the drying drum and onto discharge conveyor 16. If further drying is necessary, the conveyor 16 may be arranged to deliver the pre-forms to a suitable drying oven.

During each dwell interval after each 90° rotation of the drums, a new pair of pre-forms is formed at forming drum position 51, a pair of pre-forms is transferred from forming drum position 54 to drying drum position 61 and a pair of pre-forms is discharged from the machine at drying drum position 64 in the manner described.

Except for the wiring for timing motor M, the control system is entirely pneumatic, without any electric switches or circuits which might be affected by the moisture involved in the process and which might introduce a shock hazard. While this is an important safety and reliability feature in the present machine, it is within the scope of the invention to use an electric control system if desired. Thus, limit switches may be substituted for the pilot valves, electric relays for the pneumatic relays and solenoid valves for the pneumatically operated valves, as will be readily understood by persons skilled in the art.

A thermo setting resin may be included in the pulp slurry in tank 15 if desired, the drying dies furnishing the necessary heat to set the resin. Plastic articles without any wood pulp may also be made, using an aqueous resin furnish with artificial fibers or other solids capable of making pre-forms in the porous suction dies.

Having now described my invention and in what manner the same may be used, what I claim as new and desire to protect by Letters Patent is:

1. A molding machine comprising first and second drums mounted for rotation on a pair of parallel shafts, means for rotating said drums in unison, means for indexing said drums in predetermined dwell positions, a furnish tank beneath said first drum, porous dies mounted for radial reciprocation at a plurality of die positions on said first drum, individual means on said first drum at each of said die positions for reciprocating said dies, porous dies on said second drum, suction and air pressure means in said drums, valves in said drums at each die position arranged to apply said suction or air pressure to said dies, timing means; control means actuated by said timing means arranged to actuate said drum rotating and indexing means to move the drums through an increment of rotation equal to the spacing of said die positions around the drums, then hold the drums statioary for a dwell interval, then again actuate said drum rotating means to produce step by step rotation of the drums from one dwell position to the next; control means actuated by said timing means arranged to actuate said die reciprocating means to extend a die on the under side of said first drum downward into said furnish tank for a predetermined interval of time and then retract said die during said dwell interval; control means actuated by said timing means arranged to actuate said die reciprocating means to extend a die on said first drum which is facing said second drum for a predetermined interval of time to transfer an article pre-form formed on said furnish tank to a die on said second drum and then retract the die during said dwell interval; and control means actuated by said timing means arranged to open and close said suction and air pressure valves at predetermined times.

2. A machine as defined in claim 1, said die reciprocating means causing the die on the first drum to press the pre-form against the die on said second drum when the pre-form is transferred from the first drum to the second drum.

3. A machine as defined in claim 1, both of said drums rotating in the same direction, each article pre-form travelling through a drum rotation of 270° on said first drum from said furnish tank to transfer position and travelling through a drum rotation of 270° on said second drum from transfer position to bottom discharge position.

4. A machine as defined in claim 1, said means for rotating said drums comprising a pair of radial arms rotatable on said shafts, means for effecting engagement and disengagement between said arms and drums, a tie rod interconnecting said arms, and a fluid cylinder and piston arranged to reciprocate said arms.

5. A machine as defined in claim 1, said indexing means comprising a tapered pin adjacent each drum engageable with a tapered socket on each drum, said pins nudging said drums to indexed position independently of said rotating means.

6. A machine as defined in claim 1, said timing means being external to said drums and said control means including means on said drum engaged by means connected with said timing means for actuating said die reciprocating means and said suction and air pressure valves.

7. A machine as defined in claim 6, said timing means comprising a continuously rotating timing shaft driven by a timing motor.

8. A machine as defined in claim 7 including cams driven by said shaft for actuating said control means.

9. A machine as defined in claim 8, said control means comprising control devices at each die position on both drums controlling said valves, control devices at each die position on said first drum controlling said die reciprocating means, certain of said cams being adjacent said drums for actuating said control devices at predetermined positions of drum rotation.

10. A machine as defined in claim 9, said predetermined positions of drum rotation being at said furnish tank and pre-form transfer position with respect to said first drum and at transfer position and discharge position with respect to said second drum.

11. A machine as defined in claim 10, said control devices on said drums being grouped in radial rows on the ends of the drums and said cams for actuating said control devices being mounted on cam shafts adjacent said ends of the drums and radial to said drum shafts.

12. A machine as defined in claim 11, said control devices comprising pilot valves in a pneumatic control system.

13. A machine as defined in claim 9, said control devices comprising pilot valves in a pneumatic control system.

References Cited

UNITED STATES PATENTS

| | | | |
|---|---|---|---|
| 1,218,001 | 3/1917 | Rodwell | 162—224 |
| 3,373,079 | 3/1968 | Eastman et al. | 162—224X |

FOREIGN PATENTS

| | | | |
|---|---|---|---|
| 694,994 | 9/1964 | Canada | 162—382 |

REUBEN FRIEDMAN, Primary Examiner

T. A. GRANGER, Assistant Examiner

U.S. Cl. X.R.

162—224, 391, 393